United States Patent
Notani et al.

(10) Patent No.: US 11,556,895 B2
(45) Date of Patent: Jan. 17, 2023

(54) SYSTEM AND COMPUTER PROGRAM FOR PROVIDING HIGH DELIVERY PERFORMANCE IN A VALUE CHAIN

(71) Applicant: One Network Enterprises, Inc., Dallas, TX (US)

(72) Inventors: Ranjit Notani, Plano, TX (US); Kendall Scheeer, Dallas, TX (US)

( * ) Notice: Subject to any disclaimer, the term of this patent is extended or adjusted under 35 U.S.C. 154(b) by 293 days.

(21) Appl. No.: 16/553,446

(22) Filed: Aug. 28, 2019

(65) Prior Publication Data

US 2021/0065118 A1    Mar. 4, 2021

(51) Int. Cl.
*G06Q 10/10* (2012.01)
*G06Q 10/06* (2012.01)
(Continued)

(52) U.S. Cl.
CPC ....... *G06Q 10/103* (2013.01); *G06F 16/2379* (2019.01); *G06Q 10/067* (2013.01);
(Continued)

(58) Field of Classification Search
CPC ........... G06Q 10/103; G06Q 10/06315; G06Q 10/067; G06Q 10/101; G06Q 50/28; G06F 16/2379; H04L 12/28; H04L 63/105
(Continued)

(56) References Cited

U.S. PATENT DOCUMENTS

| | | | |
|---|---|---|---|
| 7,308,704 B2 * | 12/2007 | Vogel | G06F 21/6218 726/1 |
| 2004/0177075 A1 * | 9/2004 | Rangadass | G06F 16/21 |

(Continued)

*Primary Examiner* — James E Springer
(74) *Attorney, Agent, or Firm* — Karl L. Larson (57) ABSTRACT

A system, computer program product and method for providing high delivery performance in a value chain network utilizing a finite capacity planning and scheduling model. The system includes a plurality of remote computers in communication with a respective plurality of remote users, a service provider computer having a computer program stored in non-transient memory and one or more microprocessors, a network interface in communication with the central server and the plurality of remote computers over a shared network, a shared database, having a master data repository and an execution data repository, in communication with the service provider computer, a multi-party module configured to onboard the plurality of remote users onto the shared network via the network interface, a real-time module configured to manage in real-time a shared data model common to at least a portion of the plurality of remote users, a permissibility network module having a permission system, a control system and software tools that manages access permissions to the shared network, the master data repository and to the execution data repository, and a planner module having an initial overall planning module and re-planning module. The re-planning module is configured to re-plan upon a change in condition in the value chain network and to limit planning to only those portions of the value chain network affected by the change in condition. Each of the plurality of remote users represents one of a plurality of entities in a value chain. Each of the plurality of remote users has at least one of a plurality of roles. The network interface is configured to receive one or more transactions via the shared network. The value chain network has shared access to a shared database on the service provider computer over the shared network. The shared data model is in communication with the master data repository and the execution data repository. The permission system is configured to provide access permissions to the plurality of remote users using predefined configuration settings. The control system includes rules that vary for each of the plurality of entities and by the respective role of the plurality of remote users. The rules define the read, write, edit and (Continued)

delete permissions and access rights to specific portions of the shared data model. The service provider computer is configured to: (i) provide access to the shared network to the plurality of remote computers based on the respective access permission of the one of the plurality of remote users provided by the permissibility network module, (ii) provide access to the master data repository and to the execution data repository based on the respective access permission of the one of the plurality of remote users provided by the permissibility network module, and (iii) manage access and updates to specific portions of the shared data model for all relevant remote users of the plurality of remote users.

6 Claims, 8 Drawing Sheets

(51) Int. Cl.
*H04L 12/28* (2006.01)
*G06Q 50/28* (2012.01)
*H04L 9/40* (2022.01)
*G06F 16/23* (2019.01)

(52) U.S. Cl.
CPC ..... *G06Q 10/06315* (2013.01); *G06Q 10/101* (2013.01); *G06Q 50/28* (2013.01); *H04L 12/28* (2013.01); *H04L 63/105* (2013.01)

(58) Field of Classification Search
USPC .......................................................... 713/166
See application file for complete search history.

(56) References Cited

U.S. PATENT DOCUMENTS

| | | | |
|---|---|---|---|
| 2011/0029577 A1* | 2/2011 | Notani | G06F 16/252 707/804 |
| 2011/0264485 A1* | 10/2011 | Notani | G06Q 10/06 705/28 |
| 2014/0019471 A1* | 1/2014 | Linton | G05B 19/418 707/759 |
| 2015/0006427 A1* | 1/2015 | Notani | G06Q 10/08 705/333 |
| 2016/0217406 A1* | 7/2016 | Najmi | G06Q 10/06315 |
| 2019/0066238 A1* | 2/2019 | Notani | G06Q 30/0202 |
| 2019/0258978 A1* | 8/2019 | Mahajan | G06Q 10/06315 |
| 2020/0320481 A1* | 10/2020 | Narayanan | G06F 9/541 |

\* cited by examiner

SYSTEM AND COMPUTER PROGRAM FOR PROVIDING HIGH DELIVERY PERFORMANCE IN A VALUE CHAIN

BACKGROUND OF THE INVENTION

Field of the Invention

The present invention is generally related to enterprise value chains, and more particularly to a system and computer program for providing high delivery performance in a value chain network.

Discussion of the Background

In an increasingly global economy, there is a need for computer networks to share information between computer applications and to better adapt to meet the needs of the business enterprise(s) and computer applications using such networks. Business enterprises of all types are faced with the challenge of managing and optimizing ever more complex supply chains. These supply chains, often called "value chains," are characterized by a high degree of collaboration, cooperation, and interdependency between the enterprise and other entities or partners in the chain (e.g., raw materials producers, component manufacturers, distributors, and the like). The business goal of managing and optimizing a value chain is to minimize the costs incurred by all participants in the chain while maintaining a high level of customer service and maximizing profits. In order to achieve this goal, the enterprise strives to reduce the quantity of stored goods in the value chain, while minimizing opportunity loss by maintaining a sufficient inventory level to satisfy customer demand.

A typical value chain and/or supply chain may span multiple companies and/or entities and sometimes include hundreds or even thousands of companies and/or entities. In the prior art, each company and/or entity maintained its own separate value chain system. In particular, each company and/or entity maintained its own value chain network locally on its own computer systems, databases and computer programs associated with the value chain network. Even with so-called multi-tier or multi-echelon systems known in the prior art, each company and/or entity maintained its own multi-tier or multi-echelon system.

Whatever information was shared between the company and/or entity within the value chain network, would necessarily traverse disparate platforms. The companies would then typically communicate with other companies in the value chain via technically diverse point-to-point connections that employ a variety of transfer technologies such as exchange messages (e.g., EDI), web services, facsimile, phone, email and postal mail.

The disparate arrangement between the companies and/or entities in the value chain networks known in the prior art is inherently flawed introducing numerous issues. It introduces unnecessary communications throughout the disparate networks and requires additional computer hardware and storage. Further, information contained within the value chain network in prior art systems is not the most current and the flow of information from entity to entity is not timely. At the origination point, which is controlled by the source entity, the information to be sent is formatted for transmission and then transmitted. At the receiving end, which is controlled by the receiving entity, the information is received, unpacked, interpreted and finally acted upon. These steps are typically scheduled as periodic batch jobs and are not triggered to run in an event-driven real-time fashion. This introduces undesirable and consequential latency into the information sharing process. Information accuracy within the value chain network is not reliable in prior art systems. What is supposed to be the same information residing within each entity's systems is in fact a set of latency-ridden out of synch copies of the information due to the non-timeliness of the transfer of information between the entities. Because of the duplication of information, there is also no single version of the truth. Copied information that is out of synch with respect to age and content can result in a cascade of calculation and decision errors that ultimately grow into serious problems. Holistic planning and optimizing for a multi-party multi-tier value chain is out of reach in prior art systems primarily because of non-timely and not-reliable information. As such, each company and/or entity optimizes its execution based on its own self-interest which does not yield the holistically optimum solution for the entire value chain network at large.

Further, each company and/or entity had to potentially integrate their own internal value chain with many if not all of the other companies and/or entities in the value chain leading to n2 integrations, where 'n' is the number of companies in the value chain. Such an arrangement required additional time and expense in setting up and managing the value chain, and was highly coupled. Due to the high degree of coupling in the prior art, any changes in the value change typically resulted in extensive modifications throughout the value chain. Due to the size and complexity of most value chains, schedule-driven and batch processing value chain management systems of the prior art often resulted in stale or out of date data being used. This led to expensive reconciliation and significantly limited the types of processes that could be executed. It was also difficult if not impossible to deploy new multi-company processes using the techniques known in the prior art. Further, visibility beyond a company's immediate neighbors was problematic because multi-tier visibility was difficult if not impossible to obtain and to orchestrate.

To meet customer demand, enterprises, such as, without limitation, stores and other retail entities, forecast the future demand of their customers, including, without limitation, other enterprises, the general public and other entities or persons to which the enterprise serves or has a relationship. A sales forecast is utilized to, amongst other things, manage resources, including, without limitation, ensuring that the appropriate amount of inventory and resources are available when and where they are needed. An execution plan may be generated based on the demand shown in the sales forecast. An execution plan typically specifies the movement and placement of inventory and resources, and includes a plurality of actions that need to be taken to maintain inventory at a certain level.

In the prior art, planning engines are run in a batch mode in which all of the information relating to the value chain network is provided to the planning engine. Based on this input, planning engines known in the prior art generate a plan or model which takes significant computer resources. For instance, a typical execution plan may take 8 to 10 hours or possibly longer depending on the amount of information to be processed. Notably, the planning engines are run, and the generated plan is generated, prior to and separate from the execution stage. The information that is fed into the planning engines known in the prior art is at least in theory the then-current information or state when the planning engine was run. However, in reality, given the multiple systems involved there is no guarantee that the most current information is even incorporated into the planning engine. Because the planning engines known in the prior art created a plan for everything before the execution, the plan necessarily included significant time padding. For instance, there are numerous unknowns at the planning stage when the plan is first created and therefore execution plans known in the prior art included time padding for these unknowns. Further, value networks include multiple companies and each company may include multiple divisions and systems. Execution plans known in the prior art included time padding for each handoff between each company and often between each division and system within a company. Such time paddings create huge inefficiencies and unnecessary downtime. It also necessitates additional expenses such as premium freight costs and requirements of additional stock to reduce out-of-stock situations caused by the inefficiencies of the execution plan. As previously noted, planning engines known in the prior art are run prior to and completely separate from the execution stage. The generated execution plan and the related state information would then be input into a different engine or model and everything would be copied over and then sent over to the execution engine.

Additionally, the plan generated by planning engines known in the prior art is an overall plan of the entire value chain network based on the information that was is at least in theory the then-current information or state when the planning engine was run. Because this plan was run prior to the execution stage, the concept of re-planning based on changes to the information or state during the execution stage was unheard off. Further, some changes to the information or state are local in nature and do not require a full re-plan of the overall plan, but rather, a re-plan of only those portions of the value chain network that were necessarily affected by the change. Such a partial re-plan is unknown in the prior art and merely re-generating the overall plan using the techniques known in the prior art would affect the planning of the entire plan itself. Such a re-plan of the entire plan would not only take considerable processing time but would also likely cause havoc throughout the value chain network as unrelated portions of the plan would be unnecessarily revised.

As described above, value chain systems known in prior art resulted in significant inefficiencies and redundant network traffic and computer execution. Thus, there currently exist deficiencies associated with enterprise value chain networks, and, in particular, with providing high delivery performance in a value chain network.

SUMMARY OF THE INVENTION

Accordingly, one aspect of the present invention is to provide a system for providing high delivery performance in a value chain network utilizing a finite capacity planning and scheduling model. The system includes a plurality of remote computers in communication with a respective plurality of remote users, a service provider computer having a computer program stored in non-transient memory and one or more microprocessors, a network interface in communication with the central server and the plurality of remote computers over a shared network, a shared database, having a master data repository and an execution data repository, in communication with the service provider computer, a multi-party module configured to onboard the plurality of remote users onto the shared network via the network interface, a real-time module configured to manage in real-time a shared data model common to at least a portion of the plurality of remote users, a permissibility network module having a permission system, a control system and software tools that manages access permissions to the shared network, the master data repository and to the execution data repository, and a planner module having an initial overall planning module and re-planning module. The re-planning module is configured to re-plan upon a change in condition in the value chain network and to limit planning to only those portions of the value chain network affected by the change in condition. Each of the plurality of remote users represents one of a plurality of entities in a value chain. Each of the plurality of remote users has at least one of a plurality of roles. The network interface is configured to receive one or more transactions via the shared network. The value chain network has shared access to a shared database on the service provider computer over the shared network. The shared data model is in communication with the master data repository and the execution data repository. The permission system is configured to provide access permissions to the plurality of remote users using predefined configuration settings. The control system includes rules that vary for each of the plurality of entities and by the respective role of the plurality of remote users. The rules define the read, write, edit and delete permissions and access rights to specific portions of the shared data model. The service provider computer is configured to: (i) provide access to the shared network to the plurality of remote computers based on the respective access permission of the one of the plurality of remote users provided by the permissibility network module, (ii) provide access to the master data repository and to the execution data repository based on the respective access permission of the one of the plurality of remote users provided by the permissibility network module, and (iii) manage access and updates to specific portions of the shared data model for all relevant remote users of the plurality of remote users.

BRIEF DESCRIPTION OF THE DRAWINGS

A more complete appreciation of the present invention and many of the attendant advantages thereof will be readily obtained as the same becomes better understood by reference to the following detailed description when considered in conjunction with the accompanying drawings, wherein.

DETAILED DESCRIPTION OF THE PREFERRED EMBODIMENTS

Referring now to the drawings, wherein like reference numerals designate identical or corresponding parts throughout the several views, preferred embodiments of the present invention are described.

Real-time visibility to supply-chain-wide inventory levels and capacities is necessary to systematically and immediately optimize trade-offs when forced to re-plan due to sudden supply chain disruptions. While a fully optimized re-plan might affect a great portion of the supply network, a less disruptive re-plan may be preferred to isolate plan changes to a small subset of the supply-network. Today, this analysis is nearly always manual because the planner lacks real-time information. When the change is manual and non-systematic, the re-plans often achieve feasibility but fall short of optimal. With a real-time systematic approach, the chance of achieving a better balance between low-disruption and optimal performance is greatly enhanced.

One embodiment of the present invention improves the efficiency of a value chain network while at the same time approaches the theoretical lowest cost by bringing together the elements of multi-echelon inventory optimization (MEIO), finite capacity planning and scheduling, and real-time multi-party permissibility network. Importantly, the lowest cost objective is not even approachable until these three elements come together in one real-time system, a system that ultimately blurs the distinction between planning and execution, and in at least one embodiment obviates the need for traditional material requirements planning (MRP).

According to an embodiment of the present invention, in a multi-echelon inventory optimization (MEIO) model, the system includes a planning engine and an execution engine. The planning engine includes a simulation mode which is configured to evaluate various tradeoffs of different scenarios involving different inventory-policy settings, in order to provide optimal settings during execution. The execution engine includes a front-end interface, a calculation module, and a reports module. The front-end interface is configured to allow inventory-policy settings to be provided to the execution engine. The calculation module is configured to set inventory levels for all locations across the echelons. The reports module is configured to provide reports indicating the actual performance of the execution engine relative to the expected performance provided by the planning engine. In a multi-echelon inventory optimization (MEIO) model, how much total inventory should be in the value chain network, the amount of total inventory carried at each location, and the financial investment required to maintain the inventory allocation, must each be determined. In order to approach the theoretical lowest cost, the MEIO model must also determine what is the optimal allocation of inventory at any particular time based on the preferred objective and the actual current state of the value chain.

According to an embodiment of the present invention, in a finite capacity planning and scheduling model, the system includes a planning engine and an execution engine. The planning engine includes a repository, a BOM exploder and a calculator module. The repository includes standard line capacities and standard lead times for the value chain. The BOM exploder is configured to break out independent and dependent planned items. The calculator module is configured to create planning buckets based on forecasts, standard line capabilities, standard lead times, interdependences and supplier or item substitution rules. The scheduling engine includes a scheduler configured to periodically compute schedules using detailed capacities, constraints and alternate routing rules. Such periodic scheduling computations may occur in any frequency, including without limitation, weekly, daily, by shift or by a triggering event. In a finite capacity planning and scheduling model, when to produce products and when to purchase those products, must be determined. The timing of when to produce products considers without limitation, product demand, the amount of in stock inventory, and the cumulative lead-time required to produce and transport such products. The timing of when to purchase products considers without limitation, purchasing lead times. In order to approach the theoretical lowest cost, the finite capacity planning and scheduling model must also determine when to produce or purchase based on the actual current capacities and lead times of the value chain.

Determining the theoretical lowest cost in either the MEIO model or the finite capacity planning and scheduling model, requires that the real-time current information is analyzed. Lag time is the moral enemy of operational efficiency which is why dock to dock, order to delivery and production cycle times are often three prominent key performance indicators (KPIs) monitored in an operational value chain network. Thus, timeliness is essential in order to achieve operational efficiency.

According to an embodiment of the present invention, in a real-time multi-party permissibility network model, the system includes a real-time module, a multi-party module and a permissibility network module. The real-time module includes a master data repository and an execution data repository, each being real-time accessible. The multi-party module is configured to onboard multiple parties onto a common network, and only having to onboard once, having a common data model and shared applications with other parties in the value chain. The permissibility network module includes a permission system, a control system and other tools that maintain the network and manage permissions. The permission system is configured to provide permissions to the respective parties that respect the contracting consent of data-exchanging parties. The control system is configured to govern by entity and by role, the read, write, edit and delete permissions as well as the access rights to specific portions of the data model.

The real-time multi-party permissibility network model facilitates the real-time module and multi-party module to reach their potential enabling the value chain network to operate near its theoretical lowest cost. By its very nature, it eliminates informational lag times in the value chain network that otherwise plague other approaches known in the prior art. Using the present invention eliminates the massive and inescapable volume of data transcribing and data passing that is required in the prior art between the many separate networks and software instances owned and managed uniquely by individual companies and/or entities in the value chain. Further, the shared data model utilized by the present invention provides a single version of truth for all companies and/or entities within the value chain network which eliminates innumerable data errors and improves productivity. Amongst other things, it provides a more reliable delivery-date commitment and reduces errors by eliminating errors. It increases the productive utilization of the hardware and software resources of the value chain network. It also reduces overtime, expedited freight costs, inventory and scrap. It provides visibility to potential problems in real-time which allows corrective actions to be taken before the problems escalate into a more severe problems throughout the value chain network. Schedules are more accurate such that the appropriate action is taken at the appropriate time without additional lag time thereby shortening overall lead times. It provides better control over the production schedule. Further, it minimizes setups and tear downs, and reduces schedule regeneration times.

One embodiment of the present invention provides "control towers" for a broad set of real-time information contained within the value chain, which affords users a more comprehensive real-time view (rather than each company and/or entity having a keyhole view of its own information) of the value chain network. Providing a comprehensive real-time view of information contained within the value chain utilizing a single version of the truth within a real-time multi-party permissibility network model is of distinctly higher value and lowers the overall risk associated with the value chain network.

In order for the MEIO model and the finite capacity planning and scheduling model to achieve their optimal potential they must work seamlessly with the real-time multi-party permissibility network model and they must be able to interact with other data sources required in a multi-platform environment. Working seamlessly with the real-time multi-party permissibility network model requires the MEIO model and the finite capacity planning and scheduling model to directly use the real-time network's data (i.e., maintain a single version of the truth), provide support for real-time event triggers and avoid periodic scheduled runs, send real-time recommendations and outcomes to subscribed users and artificial intelligence (AI) agents, and provide support to functionally execute a multi-tier multi-party model. Interacting with other data sources requires the MEIO model and the finite capacity planning and scheduling model to support standard messaging protocols, provide standard templates for the required messaging between the systems, and provide support to send and receive messages in a multi-platform environment without additional lag-time.

Generally speaking, an embodiment of the present invention provides the ability for a user to perceive the current state of the value chain network utilizing a comprehensive real-time view of the information within a value chain network, interpret and process the information, and take any appropriate actions required by the current state of the value chain network in real-time.

Utilizing an embodiment of the present invention, data lags and data inaccuracies are effectively eliminated by means of shared information having a single version of the truth for all companies and/or entities in the value chain network. Visibility is provided with respect to short-term, medium-term and long-term capacity issues within the multi-party value chain. This is accomplished by automatically propagating the up-to-date demand profile through the value chain network and matching that demand to up-to-date capacities. The current state of all resources of all companies and/or entities in the value chain network is available based on immediate requirements not just the forecast.

With such visibility of true current demands and true current capacities, an autonomous agent can re-balance the supply or demand in real-time as necessary. A planner module is provided to negotiate with the vendors for additional capacities or look for alternative suppliers when there are unresolvable capacity shortages. If it is determined that real constraints cannot be fixed, the constrained amounts can be propagated back up stream so that other areas do not over build.

This process greatly reduces the time and energy required by organizations to develop realistic and executable supply demand matches across all tiers and all parties of the value chain network. It also helps vendors better understand the requirements and the loads that their customers are putting on them. This capability is enabled by the real-time shared network and the multi-party visibility that is made possible with the permission infrastructure.

An embodiment of the present invention discloses a multi-tier multi-party value chain network that has a higher sustainable degree of optimization than is possible with the prior art. This is accomplished by facilitating real-time solutions to large-scale finite capacity planning problems. To accomplish this, while simultaneously utilizing an approach that is acceptable to the individual companies and/or entities within the value chain network, the present invention includes without limitation, a shared network, shared data, shared applications, permissibility controls, workflow management, workflow management, real-time alerts, an event-driven user interface, autonomous algorithms and subnet isolation. It is understood that other modules may also be included without departing from the scope and spirit of the present invention.

According to an embodiment of the present invention, a shared network is defined as a physical network that includes one or more servers. A utility is provided that is connectable to each participating company and/or entity in the value chain network which serves as an application platform as a service (aPaaS) for the value chain network.

Shared data is defined as master data and execution-level data that is the single-version-of-truth (SVOT) for the holistic value chain network for each of the participating companies and/or entities in the value chain network. The companies and/or entities both contribute to as well as consume from the shared data. The shared data is housed and maintained on the shared network.

Shared applications are defined as the software applications that run on the shared network and use the shared data. Acknowledgements and responses to the outputs produced by the shared applications may be handled by participating companies and/or entities in the value chain network.

Permissibility controls are defined as shared network mechanisms configured to control access to the shared data in accordance with formalized consent-to-share-and-use settings agreed to by the respective companies and/or entities in the value chain network. Access includes without limitation read, write, modify and delete access, individually or some combination of these access permissions.

Workflow management is defined as a shared application utility defining (such as by software scripts) certain workflow processes, subprocesses and alternative logic paths and then set to execute under autonomous or semi-autonomous control. Various workflow paths execute when triggered by specific events or conditions. Well defined workflows can often take over repetitive manual tasks.

Real-time alerts are defined as alerts sent to all subscribers of the alert. A shared application utility monitors certain alert conditions and, upon occurrence, sends the alert. Subscribers to the alert may include without limitation any combination of applications, workflows and personnel.

An event-driven user interface (UI) is defined as a user interface that operates and responds in real-time reflecting the current state of execution-level operations. It provides users up-to-date real-time information to which they can respond to rather than having to deal with out-of-date information that significantly lags actual ongoing activities. This further helps remove latency from value chain network execution.

Autonomous algorithms are defined as programmed responses that perform specific tasks based on existing conditions. These autonomous algorithms are configured to produce appropriate outcomes when appropriately supplied with up-to-date accurate information. They may be configured to learn such that each execution produces a result that can be compared with prior results and then self-modify its programmed behavior in the direction that yields the most desired outcome.

Subnet isolation is defined as isolating problems and their respective solutions to small portions of the value chain network referred to herein as "subnets". This arrangement allows much of the value chain network to continue to function without disruption from problems that are further away in the network. Although isolating problems and solutions to subnets may result in a less than fully optimal solution for the entire value chain network, protecting much of the value chain network from excessive disruption (a.k.a., "nervousness") is often a worthwhile tradeoff (less-risk, less-cost).

In at least one embodiment, the present invention provides an intuitive time-oriented graphical user interface that (i) allows value chain planners to visually compare the effectiveness of various plan options and (ii) allows value chain operators to quickly see, assess and efficiently respond to value chain disruptions. Within the scope of the invention, this graphical user interface may display, without limitation, levels, trends, sudden changes of value chain execution risks, and the like. This provides the user an early warning and, thus, more time to mitigate or eliminate value chain problems before they occur.

As a non-limiting example, imagine a factory that is promising a dealer a specific delivery-date for the delivery of a tractor. Using the graphical user interface of the present invention, the delivery-date is visually represented as a central point on a "target" template. Concentric circles around the central point represent equal amounts of time earlier than the delivery-date. Circles farther from the center represent times that are earlier than the times represented by circles closer to the center. The specific tractor in this example is built up of a great number of assemblies, sub-assemblies, kits, components and attachments that come together at different points in time, each traversing a unique space-time journey until each is wholly incorporated into the fully assembled and delivered tractor.

Figure 1A:
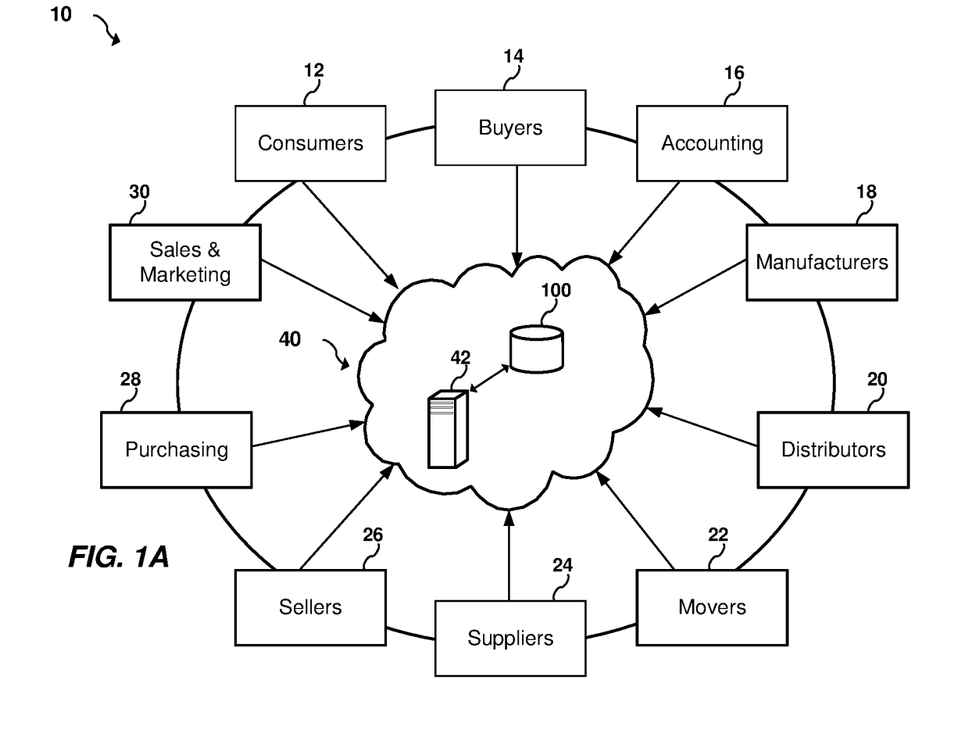
FIGS. 1A-1C and 1E are block diagrams illustrating a value chain network in accordance with an embodiment of the present invention.
Figure 1B:
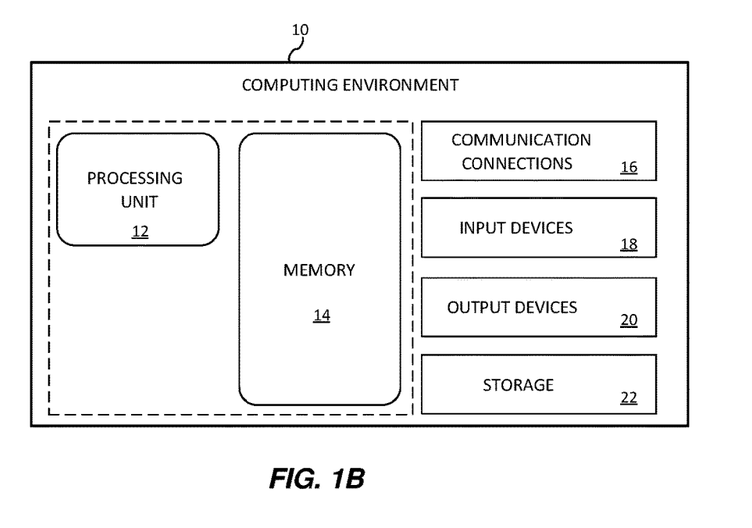
Figure 1C:
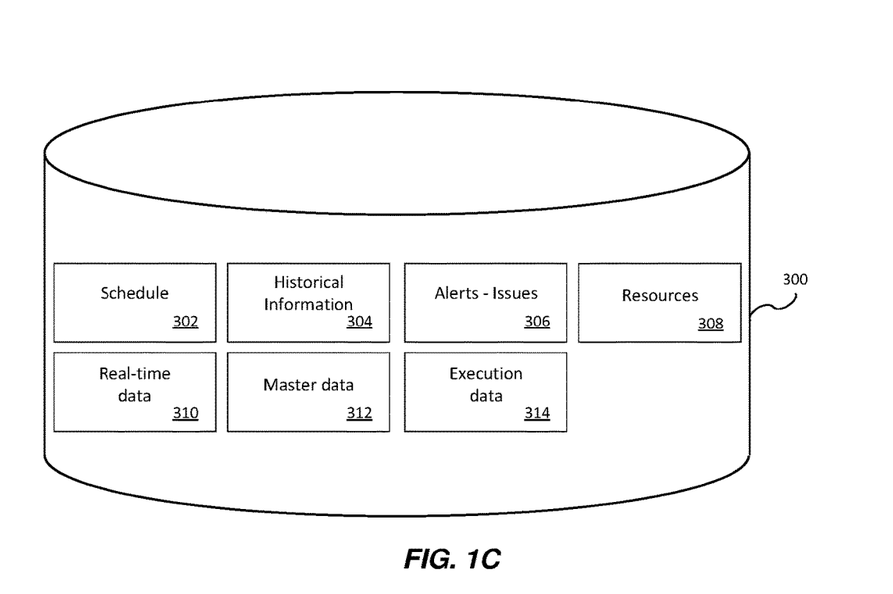
Figure 1D:
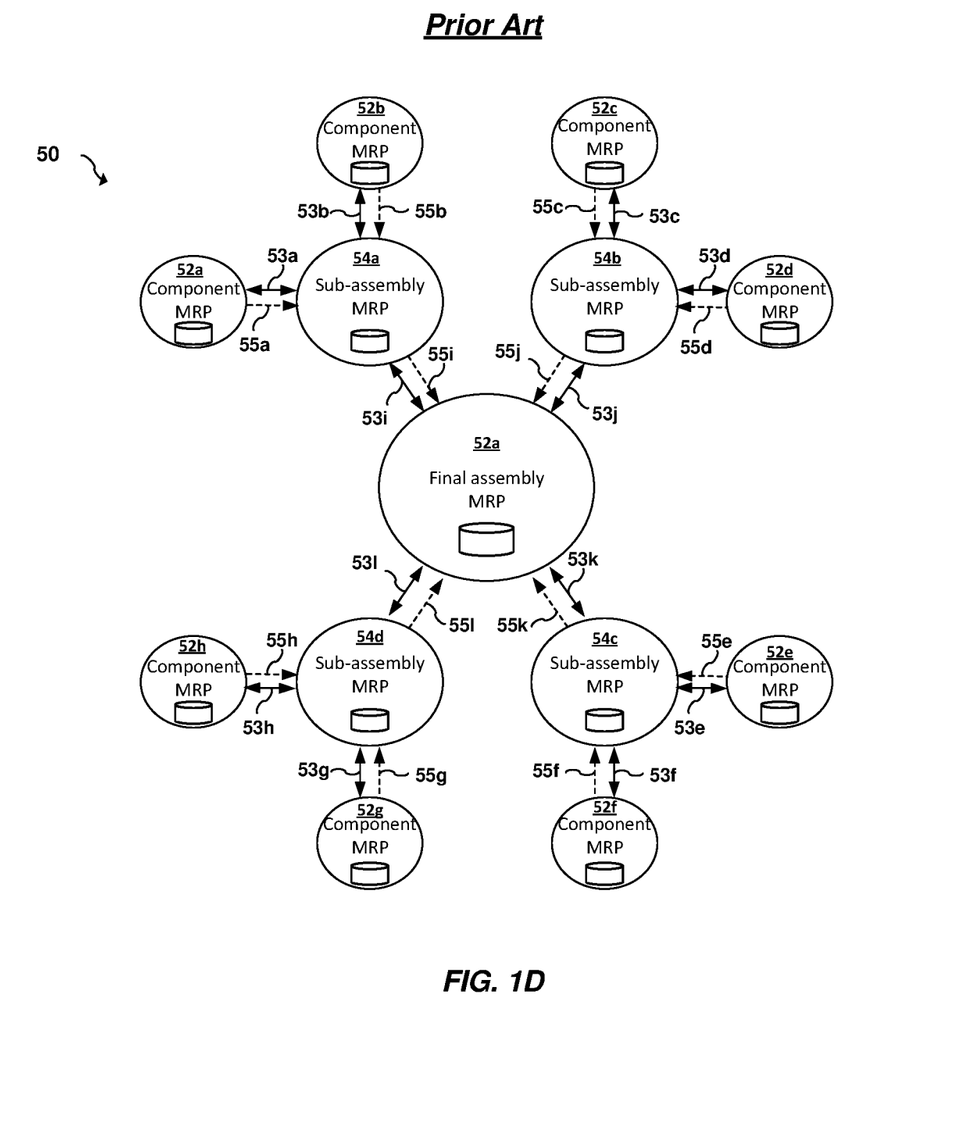
FIG. 1D is a block diagram illustrating an exemplary value chain arrangement known in the prior art.
Figure 1E:
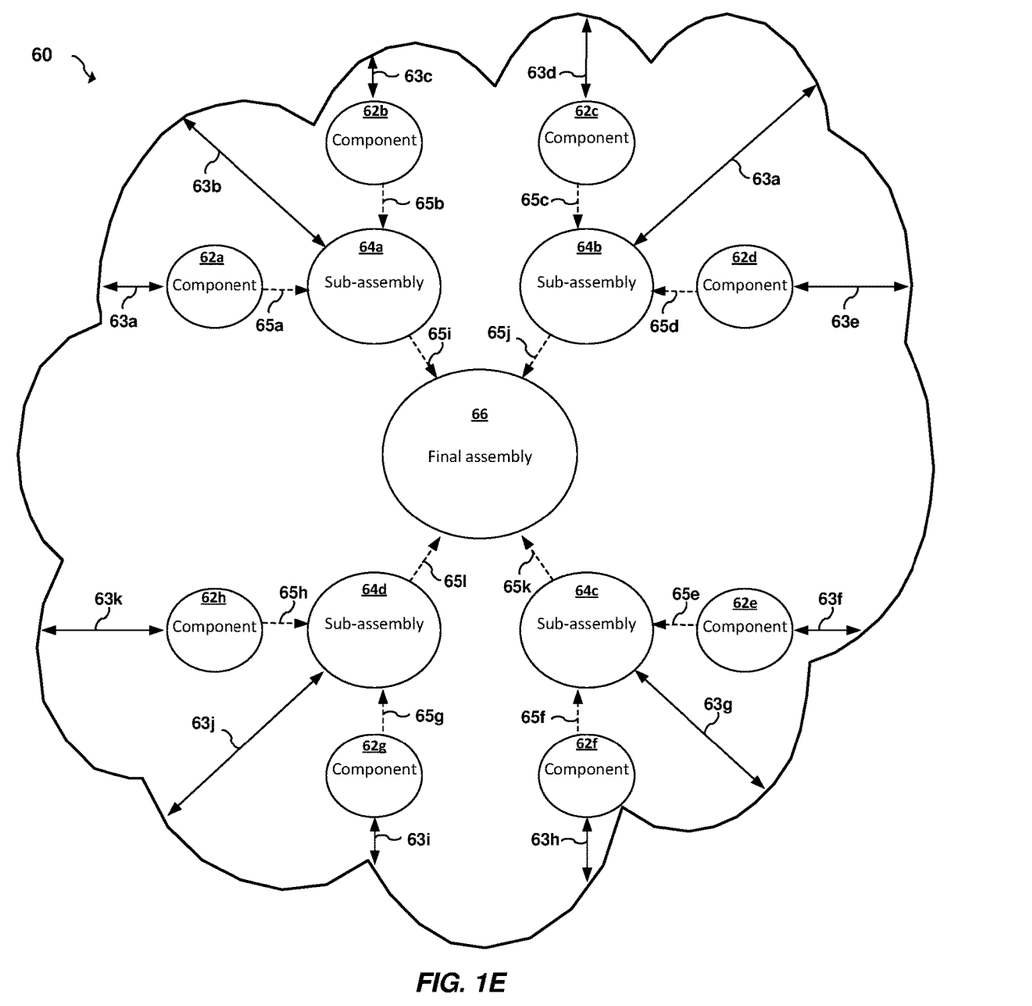
Figure 1F:
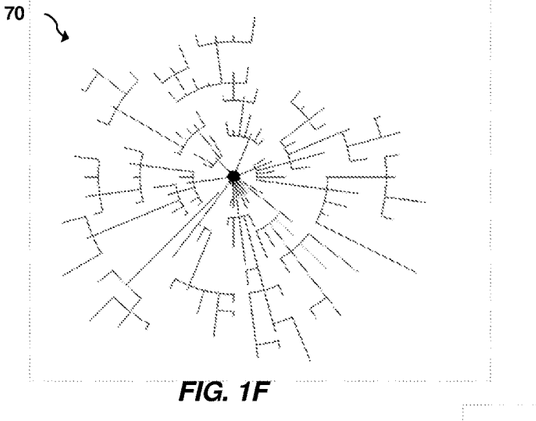
FIGS. 1F-1I are block diagrams illustrating an exemplary user interface in accordance with an embodiment of the present invention.
Figure 1G:
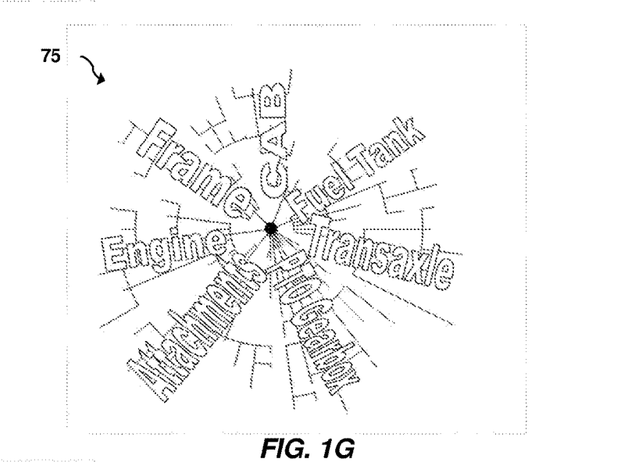

FIG. 1F represents a non-limiting exemplary plot of the tractor's bill of material (BOM) exploded against a visual time-oriented "target" template according to an embodiment of the present invention. FIG. 1G represents a non-limiting exemplary plot of the tractor's bill of material (BOM) exploded against a visual time-oriented "target" template with the tractor's major assemblies overlaid according to an embodiment of the present invention.

This way of visualizing the value chain has many useful features, including without limitation: (i) visually organizing a bill of material into pie-slice "segments" representing the major assemblies and into additional sub-segments for the sub-assemblies, kits and components; (ii) visually representing value chain lead-times by the lengths of each radial line fragment within the visualization; and (iii) visually representing value chain cumulative lead-times, which are the sums of individual lead-times, measured as the total distances from the central point to the farthest points in any segment within the visualization.

Much can be done with this interface to visually help value chain planners and operators. For example, value chain planners and operators may want to visualize the segment and specific path where the value chain has the least remaining time buffer to achieve the delivery-date, which is the value chain's critical path. The exact location in the value chain where the critical path is at risk of or is actually being violated and for what reason(s) may also be visualized. The violations may quickly visualize the leading to delivery-date delays or other forms of value chain disruptions. How one supply-chain plan compares to another, particularly in terms of removal of latencies but also in terms of risk and financial tradeoffs of one plan versus another may also be visualized. For example, deciding whether or not to use expedited freight to shorten the cumulative lead-time of a critical path segment may be visualized. Further, how much capacity remains available in each path of the many segments in order to quickly ascertain whether a demand surge can be accommodated may be visualized. How volatile a particular path is regarding its supply performance relative to plan may also be visualized. Finally, how well has a supply path historically performed, especially when hit with demand fluctuations may be visualized using this embodiment of the present invention.

Figure 1H:
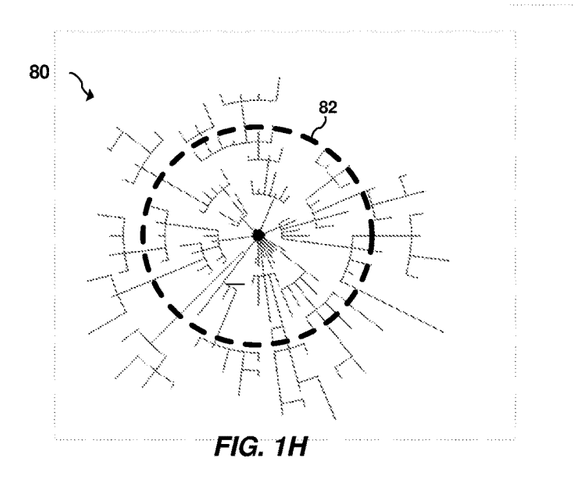

In addition, the visualization may further be used to visualize critically important information. For example, how shortening lead-times (one of the manifestations of removing latencies) lessens an organization's reliance on forecasts may be visualized, resulting in greater agility (e.g., the ability to more quickly and efficiently respond to changes like demand changes or supply disruptions). FIG. 1H represents a non-limiting exemplary plot of the tractor's bill of material (BOM) exploded against a visual time-oriented "target" template with order lead times according to an embodiment of the present invention. As shown, components and subassemblies outside of boundary 82 must be forecast whereas components and subassemblies inside boundary 82 can be pulled. Use of this visualization reduces planning, cycle and propagation time inside order lead-time in order to convert most activity to pull and ATO rather than forecast and BTS, which lessens risk, improves sense and response.

According to at least one embodiment of the present invention, the information may be visually depicted by any known means including without limitation: (i) color code the radial and/or transverse lines (ex., use red for violations and alerts); (ii) flash the radial and/or transverse lines to bring focus to a value chain area needing attention; (iii) use varied line types (e.g., dashed/solid) to show things like statistical consistency/inconsistency; (iv) use different line thicknesses to show things like relative capacities (total and/or remaining); (v) use striated radial and/or transverse lines where each striation can carry different information by being individually color coded, flashed, dashed, and thinned or fattened as described above; (vi) allow drill down at nodal points to get to additional information; (vii) allow the focus to be moved from the entire value chain view to segment views; (viii) allow portions (e.g., segments) of the visualization to be hidden; (ix) allow portions (e.g., segments) of the visualization to be highlighted; (x) allow the visualizations to be made semi-transparent to allow for overlays (e.g., to make it easy to see comparisons of different plans); (xi) to portray the "today" or "as-of" circle on the chart noting that: when the today circle envelops (is outside) the entire diagram, the diagram represents a plan; when the today circle falls onto the diagram, the diagram represents a "work-in-progress"; and when the today circle is at the center point or has passed beyond it, the diagram represents the "as-built" historical artifact; and (xii) use a non-linear time scale, such as a logarithmic scale, so that information plotted at one time distance on the diagram can show more or less detail than information plotted at a different time distance enabling, for example, the hourly, daily, weekly and monthly information to all be visible with a reasonable degree of detail. This can be considered a "telescoping" approach to bring the entire diagram into focus at one time.

Figure 1I:
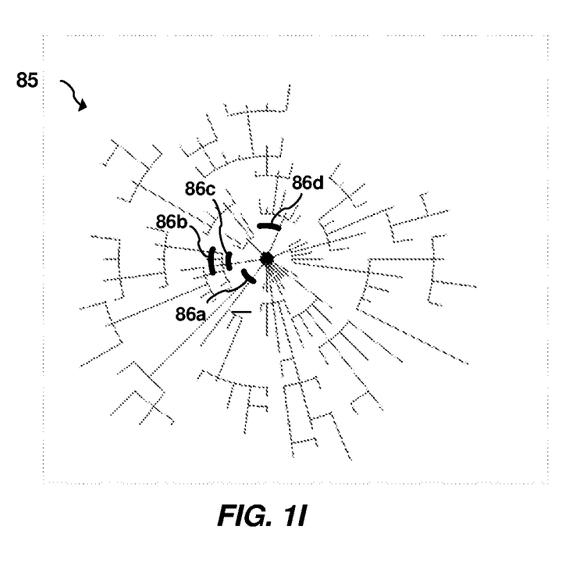

Another interesting feature of this novel way of visualizing the value chain is that it becomes easy to see when important "freeze" points come into play as depicted on the visual timeline. FIG. 1I represents a non-limiting exemplary plot of the tractor's bill of material (BOM) exploded against a visual time-oriented "target" template with progressive freeze point 86a-86d according to an embodiment of the present invention.

Lastly, a selector of some type, such as without limitation, a digital dial or a drop-down list, may be utilized to represent different information in different "modes". For example, without limitation, (i) a mode to show the historical information about lead-times (average, standard deviation, longest, shortest, etc.); (ii) a mode that scrolls through value chain plans having different objectives, such as fastest delivery, just-in-time delivery, and lowest cost delivery; (iii) a mode to show the least disruptive plan (meaning a plan that may not be the lowest cost or the plan that exactly meets the delivery-date but the plan that mitigates disruption problems by isolating the "fix" to the fewest segments (and/or sub-segments) as possible); (iv) a mode to show the inventory positions at each of the nodes in the value chain; and (v) a mode to switch from a converging value chain (the tractor example where many components come together to create a single item) to a diverging value chain (a singular bulk material being distributed and differentiated from the source location to the consuming locations).

Processing Flows

Referring to FIGS. 1A-1C, block diagrams illustrating a non-limiting exemplary value chain in accordance with an embodiment of the present invention, are shown. According to this non-limiting example, computer systems, databases and computer programs associated with the value chain network are shown. Companies and/or entities may include without limitation, consumers 12, buyers 14, accounting 16, manufacturers 18, distributors 20, movers 22, suppliers 24, sellers 26, purchasers 28, and sales and marking 30. Each company and/or entity logs-in either directly or indirectly with computer/server 42 and connects with a shared database 100. After such log-in or other communication with computer/server 42, each company and/or entity thereby is provided access to scheduling data 302, historical information data 304, alerts/anomaly data 306, resource data 308, real-time data 310, master data 312 and execution data 314.

Referring to FIG. 1D, a block diagram illustrating an exemplary value chain arrangement known in the prior art, is shown. As shown, each component manufacturer 52*a*-52*h* includes its own material requirement planning (MRP) system. Each sub-assembly 54*a*-54*d* and the final assembler 52*a* include its own MRP system. Elements 55*a*-55*l* show the physical materials flows between component manufacturers 52*a*-52*h*, sub-assemblers 54*a*-54*d* and final assembler 52*a*. Importantly, there is no single version of the truth with respect to the information between the component manufacturers 52*a*-52*h*, the sub-assemblers 54*a*-54*d* and the final assembler 52*a*. Such an arrangement necessitates excessive communications (e.g., EDI) 53*a*-53*l* in a flawed attempt to synchronize the duplicated data.

Referring to FIG. 1E, a block diagram illustrating a non-limiting exemplary value chain in accordance with an embodiment of the present invention, is shown. As compared with the exemplary value chain network known in the prior art shown in FIG. 1D, the required heavy communications between the components 62*a*-62*h*, the sub-assemblers 64*a*-64*d* and the final assembler 66 is eliminated and separate MRPs (including its systems, databases, networks and software) are not duplicated. Importantly, there is only one shared MRP as indicated in finally assembler 66. This is accomplished in part by means of shared database on a service provider computer in which each of the entities and/or companies in the value chain network share a single version of the truth with respect to a shared data model and therefore update and view the same data in accordance with access permissions defined for each of the entities and/or companies in the value chain network. This eliminates data latency issues, duplication in systems and databases, and the need for the heavy communications over a computer network that are problematic in the prior art. Further, any changes in the shared data and any updates to the execution plan resulting from such changes are immediately visible to all relevant parties in real-time.

An embodiment of the present invention provides a finite capacity planning and re-planning, and global supply demand matching in real-time on an aPaaS infrastructure. The system monitors the real-time state of the value chain network and whenever real-time conditions in the value chain network change beyond a predefined threshold, a real-time business response is automatically triggered. In this case, a re-plan or rematch. Without limitations, the major improvements of an embodiment of the present invention over the prior art include real-time perception of the current state of the value chain network, real-time decision making based on the current state, and automated real-time actions utilizing the real-time decision. Without limitation, an embodiment of the present invention novel improvements include: (i) real-time perception of immediate conditions and having good "peripheral vision" (i.e., value chain wide vision) to account for (see) all factors that are important to the decision-making step, referred to herein as "control-tower visibility", such as knowing multi-party up-to-date capacities multi-tiers deep; (ii) real-time decision-making (i.e., real-time calculations) based on what has just been perceived (event-driven processing); and (iii) real-time action (e.g., communicating a re-plan or rematch) based on what has just been decided (calculated) by the central decision-making software app.

A metaphor for the comparison is that the old art operates like a biological entity having a decentralized nervous system (sluggish—reacts and moves slowly like a starfish) versus a biological entity having a centralized nervous system (fast—reacts quickly like most mammals).

Figure 2A:
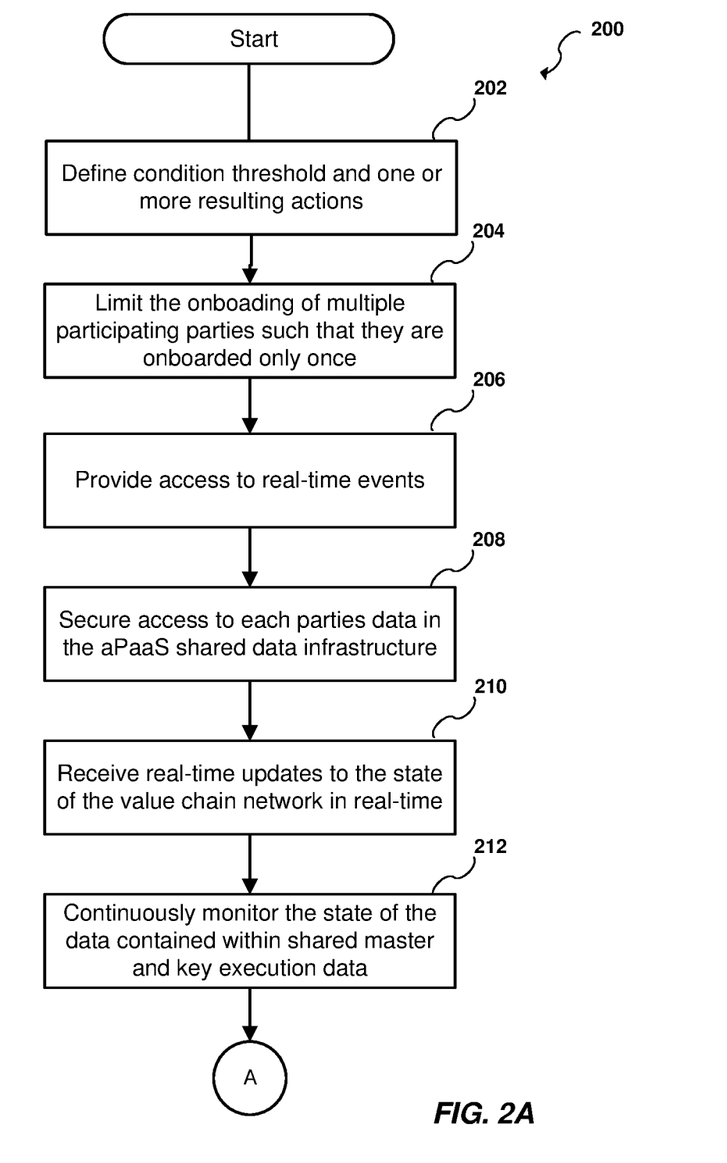
FIGS. 2A-2B are flow charts illustrating a method for providing high delivery performance in a value chain network in accordance with an embodiment of the present invention.
Figure 2B:
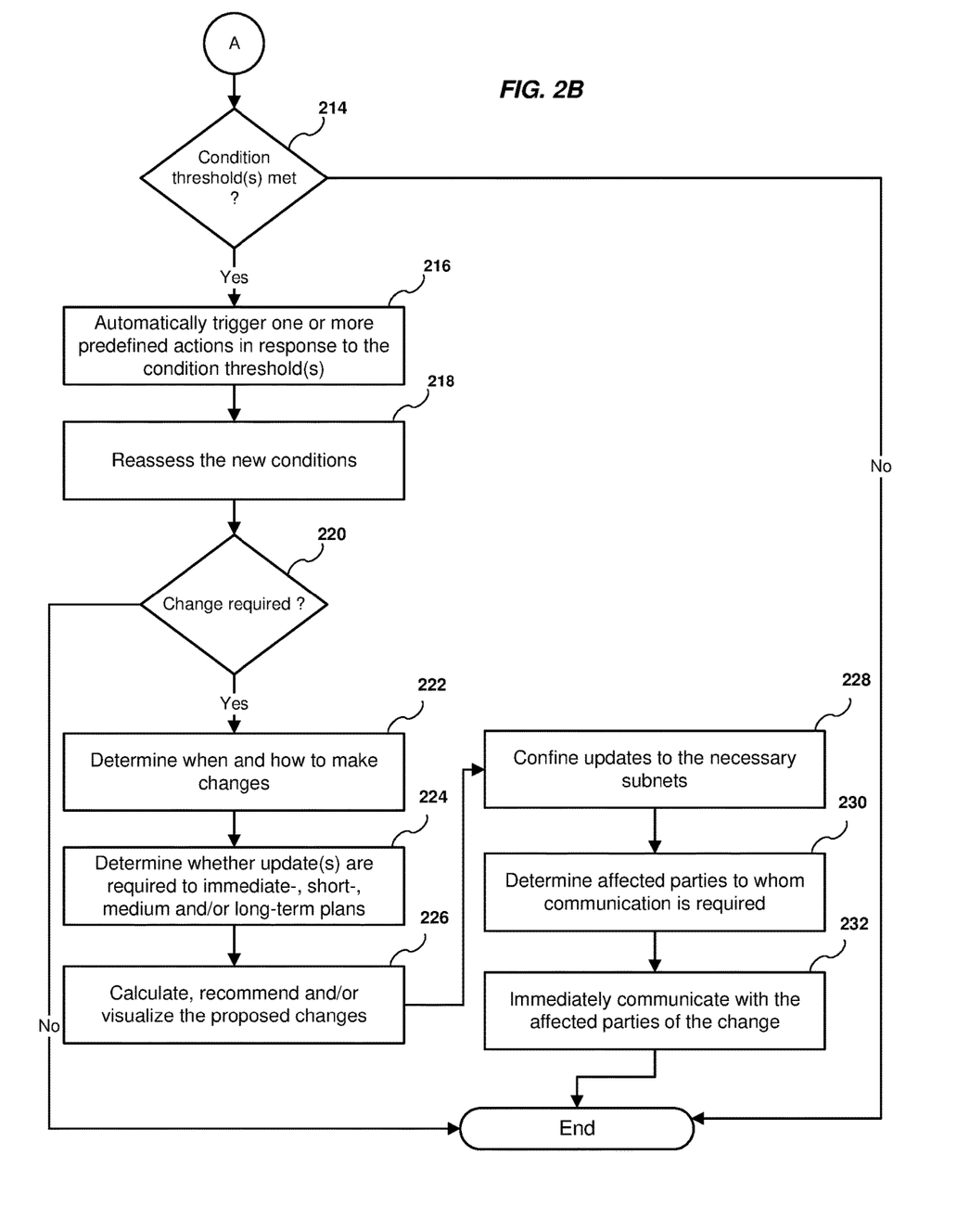

Referring to FIGS. 2A-2B, flow charts illustrating a method for providing high delivery performance in a value chain network in accordance with an embodiment of the present invention. Real-time, supply-chain wide, perception is achieved using the present invention by constant monitoring and utilizing shared master and key execution data on the real-time aPaaS infrastructure. At block 202, predefined condition thresholds and one or more resulting actions in response to the condition thresholds are defined for the multiple participating parties. The predefined condition thresholds and the one or more resulting actions are stored in shared database 100. At block 204, the system limits the onboarding of multiple participating parties to the aPaaS platform such that they are onboarded only once. This is performed to reduce the burden to onboard credentials and data with every member of the supply chain—only needing to onboard once to the aPaaS layer is required. The onboarded parties are provided access to real-time events through a physical network connection to the real-time value chain network, at block 206. At block 208, a permissibility utility provides secure access to the participating parties sensitive data in the aPaaS shared-data infrastructure. The permissibility utility is configured to provide predefined read/write/modify/delete access rights to the participating parties' sensitive data in accordance with the participating parties' respective consent contracts.

The system receives real-time updates to the state of the value chain network in at least substantially real-time, at block 210. These updates may affect the current state of the data contained within shared master and key execution data contained within a shared database. At block 212, the system continuously monitors the current state of the data contained within shared master and key execution data on the real-time aPaaS infrastructure for the multiple participating parties. A determination of whether the current state has changed beyond one of the predefined condition thresholds is made at block 214. If the current state has changed beyond one of the predefined condition thresholds, then at block 216, one or more predefined actions are automatically triggered. An aPaaS level monitoring application is subscribed to the shared data and is triggered by real-time data updates to reassess the new conditions (an event-driven real-time state-machine analyzer), at block 218. At block 220, a continuous real-time determination is made as to whether a change is required in any portion or the full current supply-chain-wide multi-participant plan. If a change is required, then when and how to make such changes is determined, at block 222. At block 224, an event-driven application or module (being triggered by outputs from the monitoring application) calculates whether there is a need to update any of the immediate-, short-, medium- and long-term plans in order to achieve the applications' programmed objective(s). Then the system programmatically calculates, recommends and/or visualizes proposed changes to a planner, at block 226. At block 228, updates are confined to only the relevant and necessary subnets within the value chain network to damp-out/mitigate what would otherwise cause excessive disruptiveness or "nervousness" in the value chain at large. Said another way, changes are limited where possible to only the relevant subnets rather than to the entire value chain.

A list of parties to which any decision-making by the system must flow and the subset of the total information that is to be communicated to each affected party is determined, at block 230. At block 232, the results from any decision-making by the system are immediately communicated to the affected parties as soon as the decisions are available. The system communicates that information to the affected parties, enabled by all parties being previously onboarded to the aPaaS platform, thus enabled to send and receive information to/from the platform and all parties being subscribed to receive real-time information from the aPaaS infrastructure.

It is often important to share the most current information between computer applications over a computer network. Information may be shared between computer applications using either (a) a single version of the truth, or (b) multiple versions of the truth. As used herein, a "single version of the truth" is an arrangement in which the same data in its most current/updated form is accessible by multiple computer applications and/or multiple parties. In order to maintain a single version of truth, any single data element is generally represented in a single location. Conversely, multiple versions of the truth are stored in multiple locations. However, in situations where there are multiple versions of the truth, each of the locations must be updateable simultaneously. Otherwise, by definition, there are at least temporary inconsistencies with respect to the representation of the data. In that case, the information may or may not be the most current. In practice, multiple versions of the truth with simultaneous updating is generally not feasible and a non-stale system cannot be built on such a representation. According to at least one embodiment of the present invention, a single version of the truth is utilized for at least a portion of the information relevant to sales forecasting.

The present invention may utilize one or more computer applications. As used herein, a "computer application" is a computer executable software application of any type that executes processing instructions on a computer or embedded in a processor, and an "application" or "application project" are the files, objects, structures, database resources and other resources used in integrating a computer application into a software platform.

The term "database" as used herein means a collection of data and is not limited to a relational database or even disk-based storage. It includes, without limitation, relational databases, memcache, Hadoop, or any other collection of data now known or developed in the future.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

This invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, portions of the invention may be embodied as a method, device, or computer program product. Accordingly, portions of the present invention may take the form of an entirely hardware embodiment or an embodiment combining software and hardware aspects all generally referred to as a "circuit" or "module."

The present invention includes a computer program product which may be hosted on a computer-usable storage medium having computer-usable program code embodied in the medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Computer program code for carrying out operations of the present invention may be written in any programming language including without limitation, object-oriented programming languages such as Java®, Smalltalk, C#or C++, conventional procedural programming languages such as the "C" programming language, visually oriented programming environments such as VisualBasic, and the like.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise then as specifically described.

The invention claimed is:

1. A system for providing high delivery performance in a value chain network utilizing a finite capacity planning and scheduling model, the system comprising:
   a plurality of remote computers in communication with a respective plurality of remote users, wherein each of the plurality of remote users represents one of a plurality of entities in a value chain, and wherein each of the plurality of remote users has at least one of a plurality of roles;
   a service provider computer having a computer program stored in non-transient memory and one or more microprocessors;
   a network interface in communication with the central server and the plurality of remote computers over a shared network, the network interface being configured to receive one or more transactions via the shared network, wherein the value chain network having shared access to a shared database on the service provider computer over the shared network;
   a shared database, having a master data repository and an execution data repository, in communication with the service provider computer;
   a multi-party module configured to onboard the plurality of remote users onto the shared network via the network interface;
   a real-time module configured to manage in real-time a shared data model common to at least a portion of the plurality of remote users, wherein the shared data model is in communication with the master data repository and the execution data repository;
   a permissibility network module having a permission system, a control system and software tools that manages access permissions to the shared network, the master data repository and to the execution data repository, wherein the permission system is configured to provide access permissions to the plurality of remote users using predefined configuration settings, the control system includes rules that vary for each of the plurality of entities and by the respective role of the plurality of remote users, and wherein the rules define the read, write, edit and delete permissions and access rights to specific portions of the shared data model; and
   a planner module having an initial overall planning module and re-planning module, wherein the re-planning module is configured to re-plan upon a change in condition in the value chain network and to limit planning to only those portions of the value chain network affected by the change in condition;
   wherein the service provider computer is configured to:
      provide access to the shared network to the plurality of remote computers based on the respective access permission of the one of the plurality of remote users provided by the permissibility network module;
      provide access to the master data repository and to the execution data repository based on the respective access permission of the one of the plurality of remote users provided by the permissibility network module;
      manage access and updates to specific portions of the shared data model for all relevant remote users of the plurality of remote users; and
      calculate and manage an execution plan for the physical flow of materials within the value chain network.

2. The system of claim 1, wherein the service provider computer is further configured to receive and store, in the shared database, a plurality of predefined condition thresholds and a plurality of condition response actions, and wherein at least one of the plurality of condition response actions is automatically triggered upon the change in condition in the value chain network exceeding at least one of the plurality of predefined condition thresholds.

3. The system of claim 2, wherein the value chain network is divided into a plurality of subnets, only a portion of the plurality of subnets is affected by the at least one of the plurality of condition response actions, and wherein the execution plan is only updated for the affected portion of the plurality of subnets.

4. The system of claim 1, wherein the service provider computer is further configured to update the shared data model in real-time immediately upon any changes in condition to the value chain network.

5. The system of claim 4, wherein upon any update to the shared data model a list of the plurality of remote users affected by the update is determined, and wherein only the affected remote users are alerted to the update.

6. The system of claim 4, wherein the service provider computer is further configured to eliminate latency between an update to the shared data model and the visibility to the update by the affected remote users.

* * * * *